(12) United States Patent
Weisbeck et al.

(10) Patent No.: US 7,954,793 B2
(45) Date of Patent: Jun. 7, 2011

(54) ELASTOMERIC ISOLATOR

(75) Inventors: Jeffrey N. Weisbeck, East Aurora, NY (US); Mark J. Ott, Orchard Park, NY (US); Gabor Rozsa, Palm Beach Gardens, FL (US)

(73) Assignee: Enidine, Inc., Orchard Park, NY (US)

( * ) Notice: Subject to any disclaimer, the term of this patent is extended or adjusted under 35 U.S.C. 154(b) by 938 days.

(21) Appl. No.: 11/636,281

(22) Filed: Dec. 8, 2006

(65) Prior Publication Data

US 2008/0136071 A1    Jun. 12, 2008

(51) Int. Cl.
*B60G 11/22* (2006.01)
(52) U.S. Cl. .................. 267/292; 267/140.3; 267/141.3; 267/141.7
(58) Field of Classification Search .................. 267/292, 267/293, 294, 66, 136, 140, 140.3, 140.4, 267/141, 141.2, 141.3, 141.7, 153, 219; 244/118.5, 244/118.6; 105/315, 321; 312/245–247
See application file for complete search history.

(56) References Cited

U.S. PATENT DOCUMENTS

| | | | |
|---|---|---|---|
| 4,684,280 A | 8/1987 | Dirkin et al. | |
| 4,911,417 A * | 3/1990 | Short | 267/256 |
| 5,108,048 A | 4/1992 | Chang | |
| 5,116,030 A | 5/1992 | Nowak et al. | |
| 5,613,668 A * | 3/1997 | Brunerye | 267/219 |
| 5,884,892 A * | 3/1999 | Gassen et al. | 248/635 |
| 5,996,981 A * | 12/1999 | Dilling | 267/153 |
| 6,382,603 B1 | 5/2002 | Monson et al. | |
| 6,446,993 B1 | 9/2002 | Huszarik et al. | |
| 6,676,116 B2 | 1/2004 | Hand et al. | |
| 6,874,731 B1 | 4/2005 | Brauer et al. | |

* cited by examiner

*Primary Examiner* — Pam Rodriguez
(74) *Attorney, Agent, or Firm* — Hiscock & Barclay, LLP

(57) ABSTRACT

An elastomeric tie rod end isolator or an elastomeric cartridge isolator that includes an outer metal sleeve defining a generally cylindrical socket, a generally cylindrical inner metal sleeve disposed coaxially within the socket in radially spaced relationship with the outer metal sleeve, and an elastomeric isolator disposed therebetween. The elastomeric isolator is a unitary annular body formed of an elastomer material and having a radially inboard surface in contact with the inner metal sleeve and a radially outboard surface in contact with the outer metal sleeve. The unitary elastomer body has a generally conical primary load-carrying section and a generally cylindrical secondary load-limiting section, each disposed coaxially about the axis of the socket. The load-limiting section includes a snubber gap formed by an axially extending groove. The annular unitary elastomeric body may be formed of an elastomer material having a relatively low damping characteristic and a relatively soft stiffness characteristic.

16 Claims, 3 Drawing Sheets

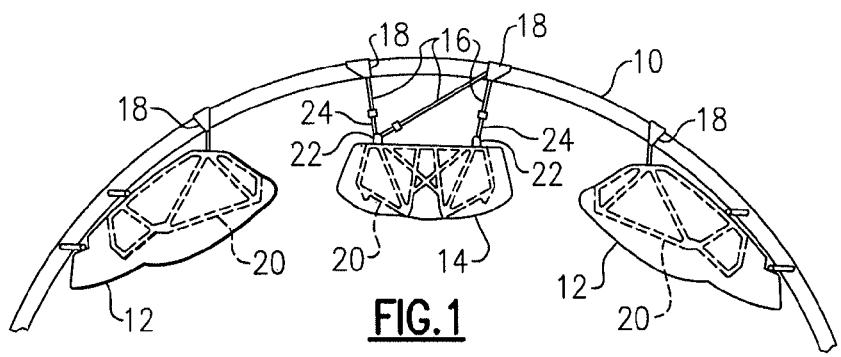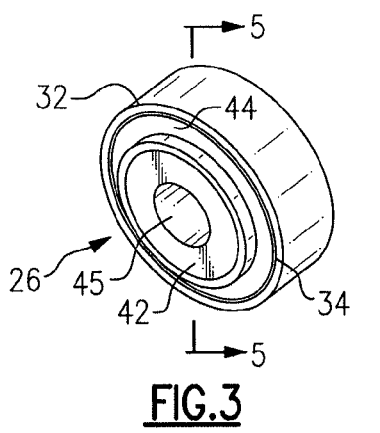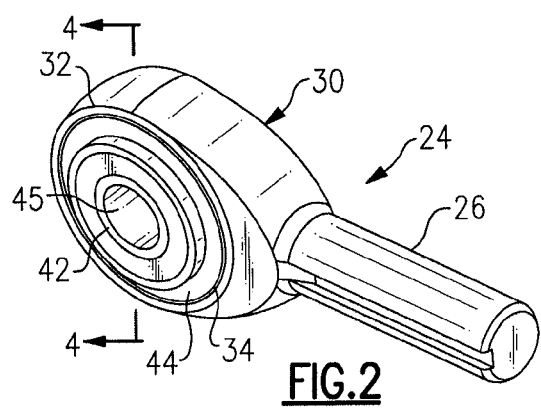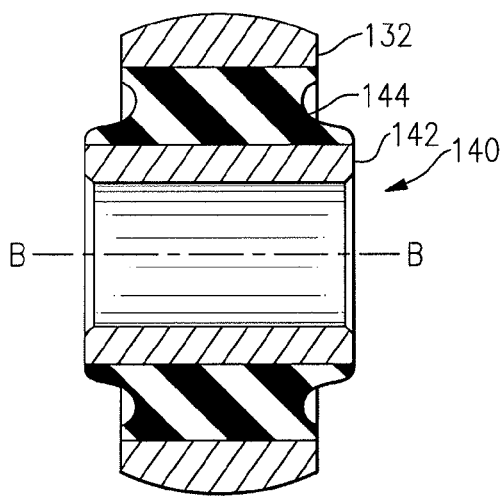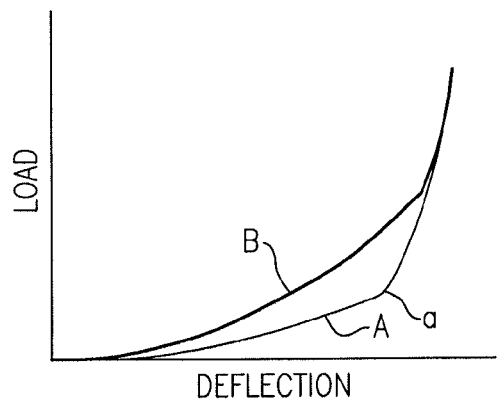

ELASTOMERIC ISOLATOR

FIELD OF THE INVENTION

This invention relates generally to an elastomeric isolator for use in connection with a suspension tie rod end and, more particularly, to an elastomeric isolator providing improved noise attenuation for use in connection with tie rods for supporting overhead stowage bins in an aircraft.

BACKGROUND OF THE INVENTION

Suspension tie rods are used in a wide variety of applications to support a component from a structural member. Commonly, an elastomeric isolator is used with the suspension tie rod to improve noise attenuation. The elastomeric isolator can be incorporated into the suspension tie rod in the form of an elastomeric tie rod end, or used in a terminating structure in the form of an elastomeric cartridge. Both the elastomeric tie rod end and elastomeric cartridge include a housing surrounding an annular elastomeric isolator disposed about an inner metal sleeve defining a bore for receiving a pin or bolt for attaching a support lug to the tie rod end or cartridge. The housing of the elastomeric tie rod end includes a threaded section for direct attachment to the suspension tie rod. The housing for the elastomeric cartridge is cylindrical, and is typically inserted into the terminating structure and is swaged in place. The elastomeric isolator serves to dampen vibration and attenuate noise, but also must be capable of carrying a load imposed by the supported component.

For example, suspension tie rods are commonly used on commercial passenger aircraft to support overhead stowage bins from the superstructure of the aircraft fuselage. U.S. Pat. No. 6,874,731 discloses a modular overhead stowage bin system for an aircraft passenger cabin. In a wide body, multi-aisle aircraft, the overhead stowage bins include outboard stowage bins positioned above the right and left side seats of the aircraft and inboard stowage bins positioned above the center seats. The overhead stowage bin compartments are readily assessable to passengers to open the bins to stow and remove carry-on luggage, packages, coats and the like when standing in the passenger aisles. As illustrated in this patent, each of the overhead stowage bins is supported from structural supports coupled to the fuselage framework by means of suspension tie rods.

In conventional systems, each suspension tie rod connects to and extends between one of the structural supports and a respective mounting lug coupled to the framework of the stowage bin it supports. Each of the suspension tie rods supporting a stowage bin includes a tie rod end having at its distal end an outer metal sleeve defining a cylindrical socket in which is coaxially disposed an inner cylindrical metal sleeve. The tie rod ends are commonly all metal and incorporate a spherical bearing. When noise attenuation is desired, an elastomeric tie rod end can replace the all-metal tie rod end, or an elastomeric cartridge isolator may be added to a terminating structure. In both the elastomeric tie rod end and elastomeric cartridge, a generally cylindrical elastomeric annular body, commonly referred to as an isolator, is disposed within the annulus formed between the two metal sleeves. The inner metal sleeve defines an axially extending central bore for receiving a mounting bolt for attaching the tie rod end to a support bracket or lug that is coupled to the framework of the stowage bin supported thereon.

In conventional practice, the elastomeric body, in addition to dampening vibrations, is made of an elastomer material having a selected noise attenuation characteristic. In addition, the elastomeric body functions to carry the load imposed by the weight of the supported stowage bin to the tie rod end. However, in designing conventional elastomeric isolators having a generally cylindrical form, a trade-off must be made when selecting the elastomer material to be used in balancing the need for greater noise attenuation while maintaining adequate load carrying capability. Elastomer materials having a low stiffness characteristically have excellent noise attenuation capability, but relatively poorer load carrying ability. Conversely, elastomer materials having a high stiffness characteristically have relatively good load carrying ability, but relatively poorer noise attenuation capability. Consequently, the need exists for an elastomeric isolator that has both a relatively high noise attenuation characteristic and a relatively good load carrying ability.

SUMMARY OF THE INVENTION

It is an object of the invention to provide an elastomeric isolator having improved noise attenuation characteristics.

It is an object of an aspect of the invention to provide an elastomeric isolator having a load-carrying section that provides for both shear and compression strains in the elastomer.

It is an object of another aspect of the invention to provide an elastomeric isolator having both a primary load carrying section and a secondary load-limiting section.

It is an object of another aspect of the invention to provide a tie rod end isolator including an elastomeric body having both a primary load carrying section and a secondary load-limiting section.

It is an object of another aspect of the invention to provide a cartridge isolator including an elastomeric body having both a primary load carrying section and a secondary load-limiting section In one aspect of the invention, an elastomeric isolator has a unitary annular body formed of an elastomer material and having a generally conical primary load-carrying section and a generally cylindrical secondary load-limiting section. The generally conical primary load-carrying section and the generally cylindrical secondary load-limiting section are disposed coaxially about a common longitudinal axis. The load-limiting characteristic of the generally cylindrical load-limiting section of the unitary elastomer body may be provided by a snubber gap formed integrally in the secondary load-limiting section. The snubber gap may be formed by an annular groove provided in the generally cylindrical secondary load-limiting section that extends axially inwardly from an end face of the generally cylindrical secondary load-limiting section towards the generally conical primary load-carrying section. The snubber gap closes when a radial load applied to the unitary elastomer body exceeds an upper limit. The unitary annular body may be formed of an elastomer material having a relatively low damping characteristic and a relatively low stiffness characteristic.

In an embodiment, the unitary annular body of the elastomeric isolator has a first generally conical primary load-carrying section and a second generally conical primary load-carrying section disposed in base-to-base relationship coaxially about a common longitudinal axis, a first generally cylindrical secondary load-limiting section extending coaxially outwardly from an end face of the first generally conical primary load-carrying section, and a second generally cylindrical secondary load-limiting section extending coaxially outwardly from an end face of the second generally conical primary load-carrying section. The load-limiting characteristic of the generally cylindrical load-limiting section of the unitary elastomer body may be provided by a first snubber gap formed integrally in the first generally cylindrical secondary load-limiting section of the unitary elastomer body and a second snubber gap formed integrally in the second generally cylindrical secondary load-limiting section of the unitary elastomer body. The first snubber gap may be formed by an annular groove provided in the first generally cylindrical secondary load-limiting section extending axially inwardly from an end face of the first generally cylindrical secondary load-limiting section towards the first generally conical primary load-carrying section, and the second snubber gap may be formed by an annular groove provided in the second generally cylindrical secondary load-limiting section extending axially inwardly from an end face of the second generally cylindrical secondary load-limiting section towards the second generally conical primary load-carrying section. Each snubber gap closes when a radial load applied to the unitary elastomer body exceeds an upper limit.

In another aspect of the invention, a tie rod end isolator or a cartridge isolator are provided for use in isolating the load. The tie rod end isolator or the cartridge isolator includes an outer metal sleeve defining a socket extending about an axis, an inner metal sleeve disposed coaxially within the socket in radially spaced relationship with the outer metal sleeve, and an elastomeric isolator disposed between said inner metal sleeve and said outer metal sleeve. The elastomeric isolator is a unitary annular body formed of an elastomer material and having a radially inboard surface in contact with the inner metal sleeve and a radially outboard surface in contact with the outer metal sleeve. The unitary elastomer body has a generally conical primary load-carrying section and a generally cylindrical secondary load-limiting section, each disposed coaxially about the axis of the socket. The annular unitary elastomeric body may be formed of an elastomer material having a relatively low damping characteristic and a relatively low stiffness characteristic.

In an embodiment of either of the tie rod end isolator or the cartridge isolator, the elastomeric isolator has a unitary elastomer body that includes a snubber gap formed integrally in the generally cylindrical secondary load-limiting section of the unitary elastomeric body. The snubber gap in the generally cylindrical secondary load-limiting section of the unitary elastomeric body is formed by an annular groove provided in the generally cylindrical secondary load-limiting section extending axially inwardly from an end face of the generally cylindrical secondary load-limiting section towards the generally conical primary load-carrying section. The snubber gap in the generally cylindrical secondary load-limiting section of the unitary elastomeric body closes when a radial load applied to the unitary elastomeric body exceeds an upper limit whereby the incremental load exceeding the upper limit is carried directly by the inner and outer metal sleeves and not by the generally conical primary load-carrying section.

In an embodiment of either of the tie rod end isolator or the cartridge isolator, the elastomeric isolator has a unitary elastomer body having a first generally conical primary load-carrying section and a second generally conical primary load-carrying section disposed in base-to-base relationship coaxially with the axis of the socket, a first generally cylindrical secondary load-limiting section extending coaxially outwardly from an end face of the first generally conical primary load-carrying section and a second generally cylindrical secondary load-limiting section extending coaxially outwardly from an end face of the second generally conical primary load-carrying section.

BRIEF DESCRIPTION OF THE DRAWINGS

For a further understanding of these and other objects of the invention, reference will be made to the following detailed description of the invention which is to be read in connection with the accompanying drawing, where:

FIG. 1 is a front elevation view of the upper portion of the passenger cabin of an aircraft illustrating the supporting of the overhead stowage bins from the fuselage structure;

FIG. 2 is a perspective view of an elastomeric tie rod end isolator for a suspension tie rod used in connection with supporting the overhead stowage bins from the fuselage structure;

FIG. 3 is a perspective view of the elastomeric cartridge isolator used in connection with supporting the overhead stowage bins from the fuselage structure;

FIG. 6 is a graphical representation of the respective load versus deflection curves characteristic of the elastomeric isolator of the invention (curve A) and a conventional prior art elastomeric isolator (curve B);

FIG. 7 is a sectioned view of a conventional prior art elastomeric tie rod end isolator;

DETAILED DESCRIPTION OF THE INVENTION

Figure 4:
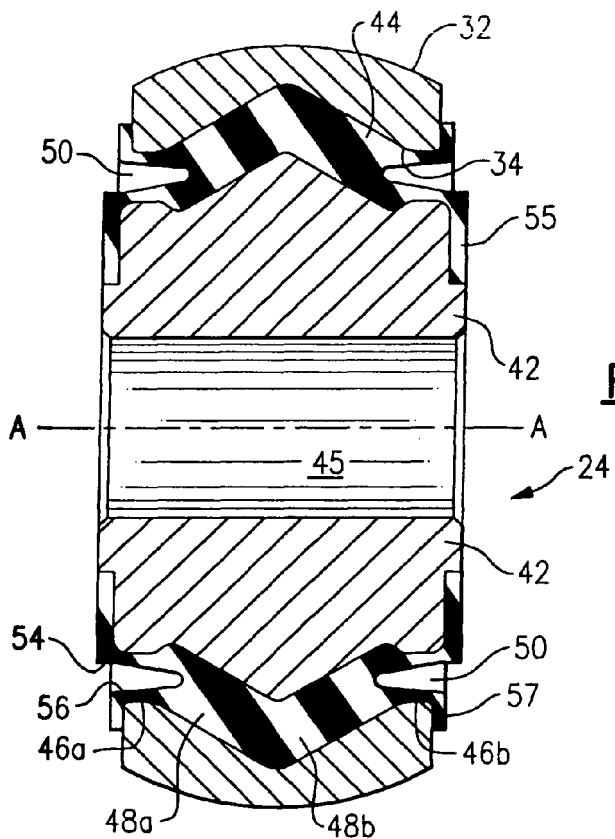
FIG. 4 is a sectioned elevation view taken along line 4-4 of the tie rod end isolator of FIG. 2 showing an exemplary embodiment of an elastomeric isolator in accordance with the invention.

The elastomeric isolators of the invention will be described herein in application in connection with the support of overhead stowage bins within the passenger compartment of an aircraft. However, it is to be understood that the elastomeric isolators of the invention may be employed in a wide variety of applications in industry and their application is not limited to that illustrated herein.

Referring now to FIG. 1, the upper portion of a wide-body, two aisle aircraft fuselage 10 is depicted. A plurality of overhead stowage bins are supported from the framework of the fuselage, including outboard stowage bins 12 disposed at the right and left sides of the fuselage above the right and left banks of passenger seats (not shown) and inboard stowage bins 14 disposed above the center bank of passenger seats (not shown). Each stowage bin is supported by a plurality of suspension tie rods 16. Each suspension tie rod 16 is connected at one end to a respective one of the support brackets 18 coupled to the framework of the fuselage 10 and at its other end to a mounting bracket or lug 22 coupled to the framework 20 of a respective one of the stowage bins 12, 14.

An exemplary embodiment of an elastomeric tie rod end isolator 24 is depicted in a perspective view in FIG. 2. The tie rod end 24 includes a stem 26, which is adapted as in conventional practice to be connected to a suspension tie rod 16, a head 30, an inner metal sleeve 42, and an elastomeric body 44. The head 30 forms an outer sleeve 32 that defines a socket 34 for housing the inner metal sleeve 42 and the elastomeric body 44.

An exemplary embodiment of a cartridge isolator 26 is depicted in a perspective view in FIG. 3. The cartridge isolator includes an outer metal sleeve 32, an inner metal sleeve 42, and an elastomeric body 44. The outer metal sleeve 32 again defines a socket 34 for housing the inner metal sleeve 42 and the elastomeric body 44.

Figure 5:
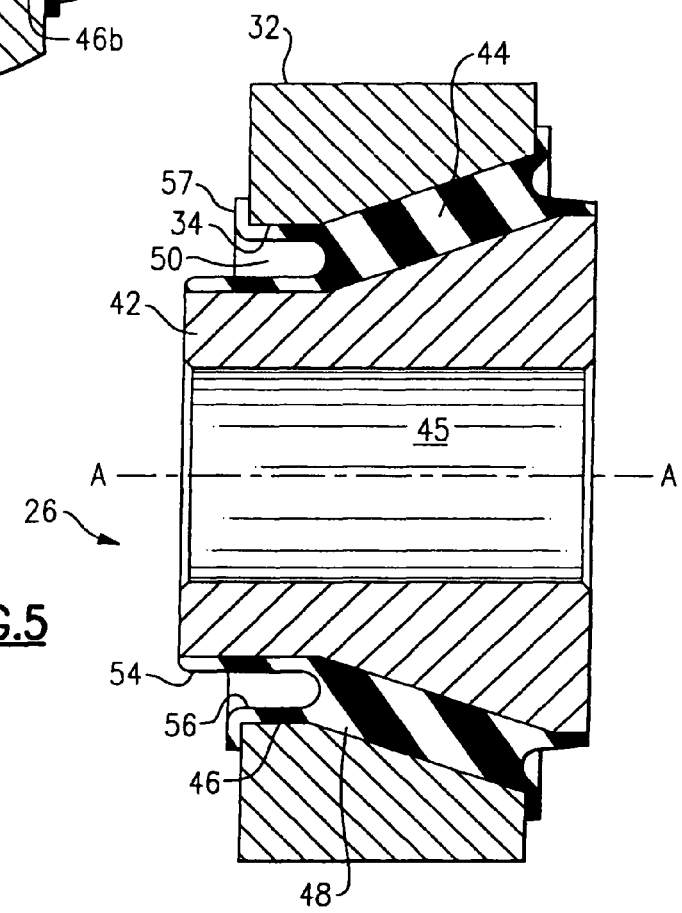
FIG. 5 is a sectioned elevation view taken along lines 5-5 of the cartridge isolator of FIG. 3 showing another exemplary embodiment of an elastomeric isolator in accordance with the invention.

As best seen in FIGS. 4 and 5, the inner metal sleeve 42 is disposed coaxially within the socket 34 and defines a cylindrical passage 45 extending axially therethrough along the axis A-A. The elastomeric isolator is an annular elastomeric body 44 formed of noise attenuating elastomer material and is disposed about the inner metal sleeve 42 and between the inner metal sleeve 42 and the outer metal sleeve 32. In manufacture of either the tie rod end isolator 24 or the cartridge isolator 26, the inner and outer metal sleeves are placed in a mold with the inner sleeve 42 disposed coaxially within the socket 34 in spaced relationship with the outer sleeve 32. With the inner and outer metal sleeves so positioned in the mold, the selected elastomer material, for example neoprene or other suitable rubber compound, is transferred into the annular space formed between the inner and outer sleeves, and cured and bonded to the metal sleeves at a specified temperature and pressure, thereby forming the annular elastomeric body 44 in situ.

Referring now to FIG. 4, in the exemplary embodiment of the elastomeric isolator 24 of the invention depicted therein, the elastometric isolator constitutes a unitary annular body 44 of rubber or other elastomer material that includes a first generally cylindrical section 46a at one end of the annular body, a second generally cylindrical section 46b at the other end of the annular body, and a pair of generally conical sections 48a and 48b extending therebetween in base-to-base relationship that form the main part of the annular body. The radially inboard and radially outboard surfaces of each of the generally conical sections 48a and 48b are inclined to the axis A-A of the annular elastomeric body 44, that is they extend axially at an angle to the axis A-A rather than parallel thereto. The outer annular surface of the inner metal sleeve 42 has a central section configured axially to correspond to the abutting inclined surfaces of the radially inboard surfaces of the conical sections 48a and 48b of the annular elastomeric body 44. Similarly, the surface of the outer metal sleeve 32 defining the socket 34 is configured axially to correspond to the abutting inclined surfaces of the radially outboard surface of the conical sections 48a and 48b of the annular elastomeric body 44.

Referring now to FIG. 5, in the exemplary embodiment of the elastomeric cartridge isolator 26 of the invention depicted therein, the elastometric isolator constitutes a unitary annular body 44 of rubber or other elastomer material that includes a generally cylindrical section 46 extending from one end of the annular body and a generally conical section 48 extending from the other end of the annular body. The radially inboard and radially outboard surfaces of the generally conical section 48 are inclined to the axis A-A of the annular elastomeric body 44, that is they extend axially at an angle to the axis A-A rather than parallel thereto. The outer annular surface of the inner metal sleeve 42 has a central section configured axially to correspond to the abutting surfaces of the radially inboard included surface of the conical section 48 of the annular elastomeric body 44 and the radially inboard axially extending surface of the generally cylindrical section 46. Similarly, the surface of the outer metal sleeve 32 defining the socket 34 is configured axially to correspond to the abutting surface of the radially outboard inclined surface of the conical section 48 of the annular elastomeric body 44 and the radially outboard axially extending surface of the generally cylindrical section 46 of the annular elastomeric body 44.

In each embodiment of the annular elastomeric body of the elastomeric isolator of the invention, the generally conical section 48 or sections 48a and 48b constitute the primary load bearing element. Because the radially inboard and outboard surfaces of the generally conical sections 48a and 48b in the FIG. 4 embodiment and the generally conical section 48 in the FIG. 5 embodiment are inclined relative to the axis A-A, when a radial load is imposed on the tie rod end isolator 24 or the cartridge isolator 26, the load is carried by the annular elastomeric body 44 in both shear and compression.

In the exemplary embodiment of the elastomeric isolator of the invention depicted in FIG. 4, an annular snubber gap 50 is formed in each of the generally cylindrical sections 46a and 46b by a groove that extends axially inwardly to the respective conical sections 48a and 48b. Similarly, in the exemplary embodiment of the elastomeric isolator of the invention depicted in FIG. 5, an annular snubber gap 50 is formed in the generally cylindrical sections 46 by a groove that extends axially inwardly to the conical section 48. In both embodiments, when a radial load is applied to the tie rod end isolator 24 or the cartridge isolator 26, the inner metal sleeve 42 and the outer metal sleeve 32 are displaced radially relative to each other and the snubber gap or gaps 50 present in the unloaded state begin to close.

As the imposed radial load increases, the snubber gap 50 will continue to decrease until it completely closes. At this point, any incremental load is carried directly between the inner and outer metal sleeves through the closed snubber gap 50 in the generally cylindrical section 46 or sections 46a and 46b of the annular elastomeric body 44 and is not imposed on the primary load-bearing conical section 48 or sections 48a and 48b of the annular elastomeric body 44. Therefore, this snubbing feature limits the maximum strain that the primary load-bearing conical section 48 or sections 48a and 48b will experience, thereby enabling the designer to select a softer, and more noise attenuating elastomer from which to form the annular elastomeric body of the elastomeric isolator of the invention.

The groove forming the annular gap 50 has inboard and outboard sides 54 and 56, respectively, which extend generally axially outwardly from the base of the gap 50. The inboard side 54 extends along the outer surface of the inner metal sleeve to terminate at the end of the inner metal sleeve 42, as in the FIG. 5 embodiment, or to terminate in a radially directed lip 55 that overlaps the end face of the inner metal sleeve 42, as in the FIG. 4 embodiment. The outboard side 56 extends along the bounding surface of the outer metal sleeve 32 to terminate in a radially directed lip 57 that overlaps the end face of the outer metal sleeve 32. The width and depth of the snubber gap 50 and the thickness of the sides 54 and 56 of the groove forming the snubber gap 50 may be varied independently of the thickness of the primary load-bearing conical section 48 or sections 48a and 48b of the annular elastomeric body. The width of the snubber gap 50 determines the deflection at which the load-displacement curve progression begins. The thickness of the elastomeric layer influences the rate of progression of deflection with increasing load once the snubber gap 50 has closed.

Thus, the integral snubber feature of the elastomeric isolator of the invention inherently limits deflection and prevents overloading of the elastomer, thereby eliminating the need for additional components to limit deflection or prevent overloading. The superior performance of the elastomeric isolator of the invention in a rod end or cartridge isolator application is illustrated in FIG. 6. Curve A represents a characteristic load versus deflection curve for an elastomeric tie rod end isolator or elastomeric cartridge isolator having a generally conical primary load bearing section and a generally cylindrical section including an integral snubber. Curve B represents a characteristic load versus deflection curve for a conventional prior art elastomeric tie rod end isolator such as depicted in FIG. 7 wherein the isolator 140 constitutes an annular cylindrical elastomeric body 144 extending axially along the axis B-B between a cylindrical inner metal sleeve 142 and an outer metal sleeve 132 defining the cylindrical socket within which the elastomeric body 144 and inner sleeve 142 are disposed. In the prior art isolator depicted in FIG. 7, when a radial load is imposed, the load is carried from the inner metal sleeve 142 to the outer metal sleeve 132 by the annular cylindrical elastomeric body 144 solely in compression. However, as noted previously, because the radially inboard and outboard surfaces of the generally conical sections 48a and 48b in the FIG. 4 embodiment of the invention and the generally conical section 48 in the FIG. 5 embodiment of the invention are inclined relative to the axis A-A, when a radial load is imposed on the tie rod end isolator or cartridge isolator, the load is carried by the annular elastomeric body 44 in both shear and compression. As illustrated in FIG. 6, curve A has a reduced slope and a more linear nature than does curve B. Additionally, short circuiting of the applied load to the elastomeric body to the metal sleeve, as indicated by point "a" on curve A, occurs at a lower applied load with the elastomeric body having an integral snubber feature (curve A) than with the prior art elastomeric body (curve B).

Figure 8:
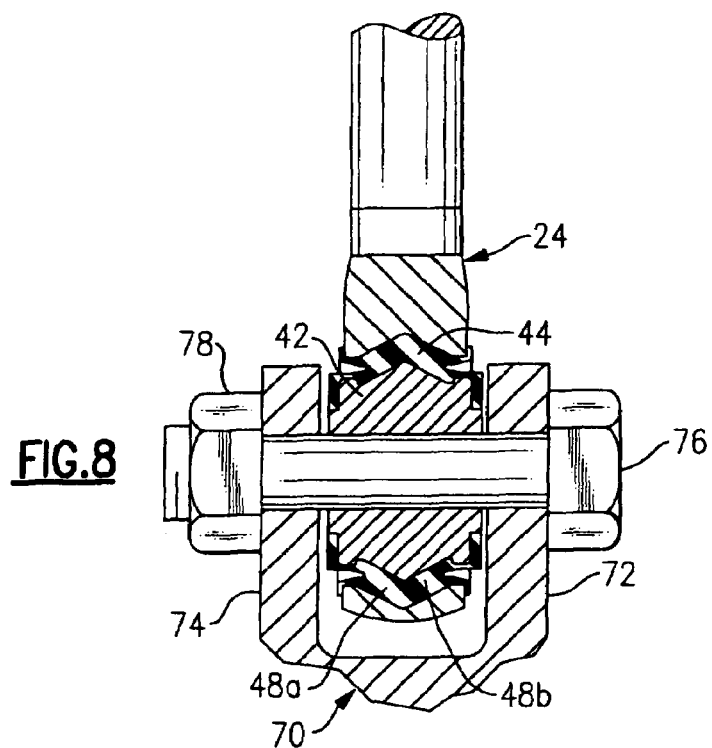
FIG. 8 is a partial sectioned elevation view illustrating an application of a tie rod end incorporating the FIG. 4 embodiment of an elastomeric isolator in accordance with the invention.

The connection of a tie rod end isolator 24 equipped with the symmetric isolator of FIG. 4 is illustrated in FIG. 8. The tie rod end isolator 24 is inserted between the radial side lugs 72 and 74 of a mounting bracket 70 with the center bore 45 of the isolator 24 aligned with the bores of the lugs 72 and 74. A mounting bolt 76 is inserted through the aligned bores and a nut 78 is threaded onto the distal end of the bolt 76 and tightened down. Because the inclined surfaces of conical sections 48a and 48b of the elastomeric body 44 are in opposition, the axial components of the respective shear forces generated on the inclined surfaces of the conical sections 48a and 48b of the elastomeric body 44 will counterbalance each other, thereby eliminating any net axial component of the shear force.

Figure 9:
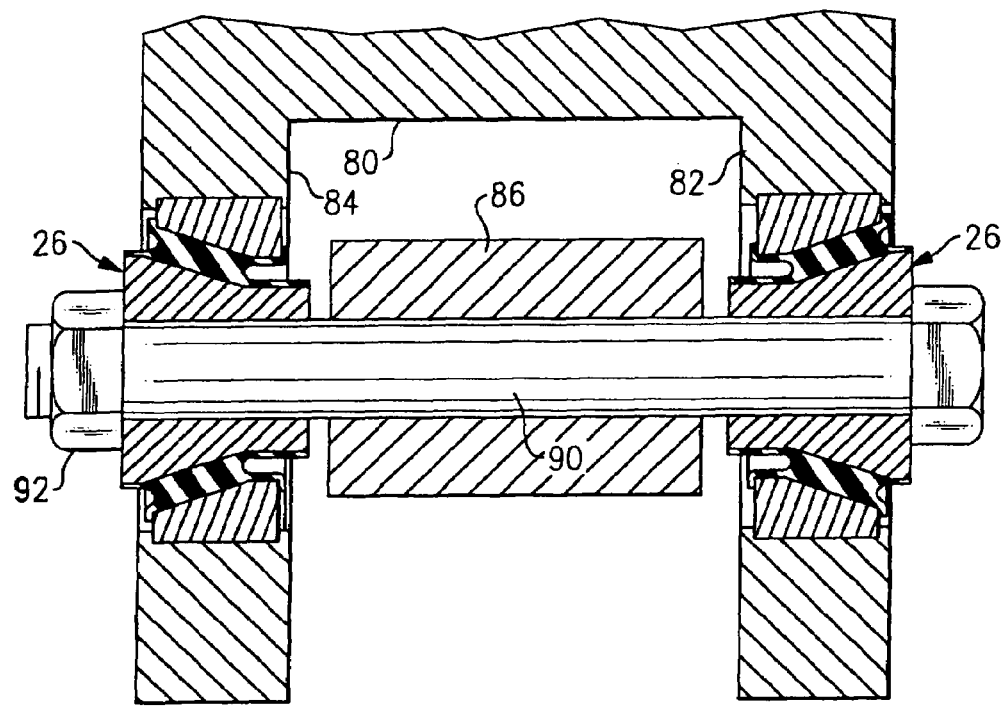
FIG. 9 is a partial sectioned elevation view illustrating an application of a cartridge isolator incorporating the FIG. 5 embodiment of an elastomeric isolator in accordance with the invention.

The connection of a paired set of cartridge isolators 26 each equipped with an asymmetric isolator of FIG. 5 is illustrated in FIG. 9. The cartridge isolators 26 are inserted and staked into the radial side lugs 82 and 84 of a mounting bracket 80 with the center bores 45 of the paired isolators 26 aligned with the bores of the lugs 82 and 84. A clevis lug 86 is positioned between the respective paired asymmetric cartridge isolators. A mounting bolt 90 is inserted through the aligned bores and a nut 92 is threaded onto the distal end of the bolt 90 and tightened down. As illustrated, the paired set of asymmetric cartridge isolators 26 are advantageously positioned in a mirrored relationship so that the axial components of the respective shear forces generated on the inclined surfaces of the elastomeric bodies 44 will counterbalance each other, again eliminating any net axial component of the shear force. However, it is to be understood that the asymmetric isolator of FIG. 5 may also be used in single, rather than paired applications. When a single mounting bracket equipped with an asymmetric isolator as illustrated in FIG. 5 is employed, a net axial component of the shear load from the elastomeric body 48 will be exerted on the mounting bracket. The presence of such an axial component of the shear load on the mounting bracket can be used to provide a fail-safe design in one direction.

Improved noise attenuation relative to conventional elastomeric isolators, such as the prior art elastomeric isolator of FIG. 7, is achieved in the elastomeric isolator of the invention through the conical geometry of the primary load bearing section and the selection of the elastomer material. As noted before, because of the conical geometry of the primary load-bearing section 48 or sections 48a and 48b, any applied load is carried in both shear and compression. Shear loading reduces the isolator stiffness and improves the attenuation of noise when compared to compression loading alone. Additionally, because the snubbing feature 50 limits the maximum load that the conical elastomeric section 48 or sections 48a and 48b must carry, a softer less stiff, low dampening elastomer may be selected to provide greater a noise attenuating characteristic. Of course, the elastomer selected should also have relatively high strength and good bondability to the inner and outer metal sleeves.

Although the asymmetric embodiment of the elastomeric isolator of the invention is shown herein in the cartridge isolator 26 and the symmetric embodiment of the elastomeric isolator of the invention is shown herein in the tie rod end isolator 24, it is to be understood that both the asymmetric embodiment and the symmetric embodiment may be incorporated into either a cartridge isolator or a tie rod end isolator.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An elastomeric isolator comprising a unitary body formed of an elastomer material, said unitary body having a generally conical primary load-carrying section and a secondary load-limiting section, said secondary load-limiting section including an integrally formed snubber gap formed as a single annular peripheral groove provided in said secondary load-limiting section, said peripheral groove extending over the entire circumference of the secondary load-limiting section which closes when a predetermined load limit to said unitary body is exceeded.

2. An elastomeric isolator as recited in claim 1 wherein said unitary body is annular and formed of an elastomer material having a relatively low damping characteristic and a relatively low stiffness characteristic.

3. An elastomeric isolator comprising a unitary annular body formed of an elastomer material, said unitary annular body having a generally conical primary load-carrying section and a generally cylindrical secondary load-limiting section, said generally conical primary load-carrying and said generally cylindrical secondary load-limiting section each being disposed coaxially about a common longitudinal axis, said secondary load-limiting section including an integrally formed snubber gap, said snubber gap being provided as a single annular peripheral groove in said generally cylindrical secondary load-limiting section extending axially inward from an end face towards said conical primary load-carrying section and entirely around the entire circumference of said cylindrical secondary load-limiting section, said groove being caused to close when a predetermined load limit to said unitary elastomer body is reached.

4. An elastomeric isolator as recited in claim 3 wherein said unitary elastomer body has a first generally conical primary load-carrying section and a second generally conical primary load-carrying section disposed in base-to-base relationship coaxially about a common longitudinal axis, a first generally cylindrical secondary load-limiting section extending coaxially outwardly from an end face of said first generally conical primary load-carrying section and a second generally cylindrical secondary load-limiting section extending coaxially outwardly from an end face of said second generally conical primary load-carrying section.

5. An elastomeric tie rod end isolator for use in connection with a support rod, said tie rod end isolator comprising:
   an outer metal sleeve defining a socket extending therethrough about an axis;
   an inner metal sleeve disposed coaxially within the socket in radially spaced relationship with said outer metal sleeve, said inner metal sleeve having a central bore extending therethrough coaxially with the axis of the socket; and
   an elastomeric isolator according to claim 4 disposed between said inner metal sleeve and said outer metal sleeve, said unitary annular body having a radially inboard surface in contact with said inner metal sleeve and a radially outboard surface in contact with said outer metal sleeve.

6. An elastomeric tie rod end isolator as recited in claim 5 wherein the snubber gap in said generally cylindrical secondary load-limiting section of said unitary annular body of said elastomeric isolator closes when a load applied to said unitary elastomer body exceeds an upper limit whereby the incremental load exceeding the upper limit is carried directly by said inner and outer metal sleeves and not by said generally conical primary load-carrying section.

7. An elastomeric tie rod end isolator as recited in claim 5 wherein said unitary elastomer body is formed in-situ between said inner metal sleeve and said outer metal sleeve.

8. An elastomeric tie rod end isolator as recited in claim 5 further comprising a first snubber gap formed integrally in said first generally cylindrical secondary load-limiting section of said unitary elastomer body and a second snubber gap formed integrally in said second generally cylindrical secondary load-limiting section of said unitary elastomer body.

9. An elastomeric tie rod end isolator as recited in claim 8 wherein:
   said first snubber gap is formed by an annular groove provided in said first generally cylindrical secondary load-limiting section extending axially inwardly from an end face of said first generally cylindrical secondary load-limiting section towards said first generally conical primary load-carrying section; and
   said second snubber gap is formed by an annular groove provided in said second generally cylindrical secondary load-limiting section extending axially inwardly from an end face of said second generally cylindrical secondary load-limiting section towards said second generally conical primary load-carrying section.

10. An elastomeric isolator as recited in claim 3 wherein said unitary annular body is formed of an elastomer material having a relatively low damping characteristic and a relatively low stiffness characteristic.

11. An elastomeric cartridge isolator comprising:
   an outer metal sleeve defining a socket extending therethrough about an axis;
   an inner metal sleeve disposed coaxially within the socket in radially spaced relationship with said outer metal sleeve, said inner metal sleeve having a central bore extending therethrough coaxially with the axis of the socket; and
   an elastomeric isolator disposed between said inner metal sleeve and said outer metal sleeve, said elastomeric isolator being a unitary annular body formed of an elastomer material and having a radially inboard surface in contact with said inner metal sleeve and a radially outboard surface in contact with said inner metal sleeve and a radially outboard surface in contact with said outer metal sleeve, said unitary body having a generally conical primary load-carrying section and a generally cylindrical secondary load-limiting section, said generally conical primary load-carrying section and said generally cylindrical secondary load-limiting section each being disposed coaxially about a common longitudinal axis wherein a snubber gap is integrally formed in said generally cylindrical secondary load-limiting section of said elastomeric isolator, said snubber gap being formed as a single peripheral annular groove in said generally cylindrical secondary load-limiting section extending axially inward from an end face toward said primary load-carrying section and over the entire circumference of said secondary load-limiting section wherein said peripheral annular groove closes when a load applied to said unitary elastomer body exceeds an upper limit.

12. An elastomeric cartridge isolator as recited in claim 11 wherein said unitary annular body is formed of an elastomer material having a relatively low damping characteristic and a relatively soft stiffness characteristic.

13. An elastomeric cartridge isolator as recited in claim 11 wherein said unitary elastomer body is formed in-situ between said inner metal sleeve and said outer metal sleeve.

14. An elastomeric cartridge isolator as recited in claim 11 wherein said elastomeric isolator comprises a unitary annular body formed of an elastomer material, said unitary elastomer body having a first generally conical primary load-carrying section and a second generally conical primary load-carrying section disposed in base-to-base relationship coaxially about a common longitudinal axis, a first generally cylindrical secondary load-limiting section extending coaxially outwardly from an end face of said first generally conical primary load-carrying section and a second generally cylindrical secondary load-limiting section extending coaxially outwardly from an end face of said second generally conical primary load-carrying section.

15. An elastomeric cartridge isolator as recited in claim 14 further comprising a first snubber gap formed integrally in said first generally cylindrical secondary load-limiting section of said unitary elastomer body and a second snubber gap formed integrally in said second generally cylindrical secondary load-limiting section of said unitary elastomer body.

16. An elastomeric cartridge isolator as recited in claim 15 wherein:
   said first snubber gap is formed by an annular groove provided in said first generally cylindrical secondary load-limiting section extending axially inwardly from an end face of said first generally cylindrical secondary load-limiting section towards said first generally conical primary load-carrying section; and
   said second snubber gap is formed by an annular groove provided in said second generally cylindrical secondary load-limiting section extending axially inwardly from an end face of said second generally cylindrical secondary load-limiting section towards said second generally conical primary load-carrying section.

* * * * *